Oct. 9, 1923.
C. N. HARE
1,470,361
OCEAN COMPRESSED AIR POWER
Filed June 7, 1921
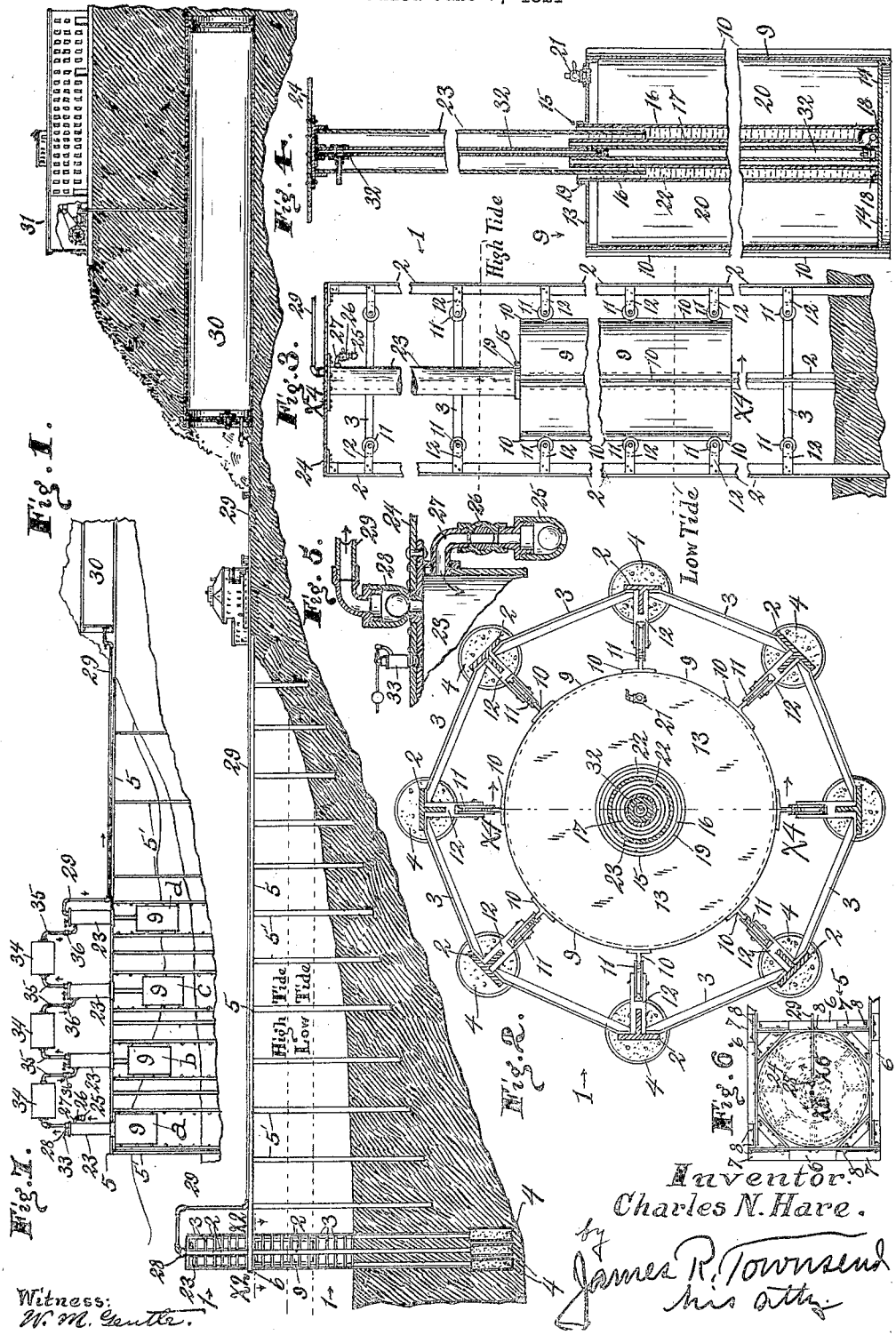
Inventor:
Charles N. Hare.
by James R. Townsend
his atty.
Witness:
W. M. Genter.

Patented Oct. 9, 1923.

1,470,361

UNITED STATES PATENT OFFICE.

CHARLES N. HARE, OF LOS ANGELES, CALIFORNIA.

OCEAN COMPRESSED-AIR POWER.

Application filed June 7, 1921. Serial No. 475,584.

*To all whom it may concern:*

Be it known that I, CHARLES N. HARE, a citizen of the United States, residing at Los Angeles, in the county of Los Angeles and State of California, have invented a new and useful Ocean Compressed-Air Power, of which the following is a specification.

This is an improvement of my ocean compressed air power shown and described in my application filed November 3rd, 1920, Serial No. 421,569, patented Aug. 30, 1921, #1,389,445; and it relates to means for utilizing tide and wave motion to compress air.

An object of this invention is to provide an appliance that is effective in compressing air in large volume and storing it in a tank or air tight tunnel of vast capacity so that a continuous supply of compressed air power is available for all purposes.

Another object of this invention is to provide an air compressing apparatus that is simple in construction and operation, and also strong and durable so that it will not be likely to be injured by heavy tides and waves.

Another object of this invention is to provide an appliance with reciprocating and stationary tanks that have telescoping relationship without actual contact of their walls whereby friction between the tanks is eliminated.

Another object of the invention is to enlarge the active surface of the reciprocating tank so as to increase the pressure applied to the air. This I do by enlarging the float or reciprocating tank and its cage enclosure without changing the relationship of the liquid seal compartment to the stationary tank. In other words I increase the pressure applied to the air about three fold without changing the general construction and operation of my appliance as shown in said application.

Other objects, advantages and features of invention may appear from the accompanying drawing, the subjoined detail description and the appended claims.

The accompanying drawing illustrates the invention.

Figure 1 is an elevation of a plant embodying the invention with a subterranean air storage tank.

Fig. 2 is an enlarged plan section on line $x^2$, Fig. 1 showing in detail, the tank cage and associated parts.

Fig. 3 is a fragmental sectional view of the tank and cage appliance in side elevation.

Fig. 4 is a fragmental sectional view on line $x^4$, Figs. 2 and 3.

Fig. 5 is an enlarged fragmental section on line $x^5$, Fig. 6.

Fig. 6 is a fragmental plan of the cage at the sea end of a pier.

Fig. 7 is a battery of units operated by ocean movement and successively connected to storage tanks that supply the succeeding pumps of the battery so as to step up the air pressure.

I provide a cage 1 comprising uprights 2 that are spaced equidistant apart and an equal radial distance from a common center; and secure them together by cross braces 3. The lower ends of uprights 2 are provided with anchor blocks 4 that preferably consist of cement.

In installing the cage 1, I first sink pipes a considerable distance in the ocean bed, excavating the sand or other material from them as they are lowered by means well known. After the pipes are sunk, the uprights 2 are secured in proper position in the pipes, and then liquid or plastic cement is applied around their lower ends to form anchor blocks 4; after which the pipes are removed to permit the sand, rock and soil to fill the holes and firmly secure the uprights 2 in the ground. Then cross braces 3 are spaced apart and positioned horizontally and secured to uprights 2 by riveting.

Cage 1 extends a considerable distance above the pier 5 and is secured at the sea end by angle irons, clips and rivets 6, 7 and 8, respectively as indicated in Fig. 6.

Pier 5 is supported by piling 5' and extends from the shore out to sea, a sufficient distance to position cage 1 where heavy waves and ground swells will best actuate the reciprocating tank 9.

Tank 9 is provided with guide rails 10 spaced equidistant around its outer wall so that the rails will engage the grooved rollers 11 that are secured by brackets 12 to uprights 2.

The rollers 11 are so spaced on their uprights 2, that three or more of them will always engage each of the guide rails 10 on the reciprocating tank 9; so that said tank will be held central to the axis of the cage as the tank is moved up or down.

Tank 9 has its ends securely closed by upper and lower end plates 13, 14 respectively; and through an opening 15, in plate 13, there is inserted a pair of cylinders 16, 17 respectively that have their lower ends integrally connected as at 18, see Fig. 4; and part 18 is secured to end 14 by welding or brazing. Also cylinder 16 has its upper end secured by welding or brazing to the cylindrical flange 19 on end 13.

By the foregoing construction an air tight chamber 20 is formed within tank 9 so it is made especially buoyant by exhausting the air by suction through valve 21, forming a vacuum in chamber 20; also by this construction and arrangement of parts an annular compartment 22 is formed between cylinders 16, 17 that contains a liquid seal into which is extended the open lower end of stationary cylinder 23.

The upper end of cylinder 23 is firmly secured to top plate 24 of cage 1 and held in position to be telescoped by cylinders 16, 17 when the tank 9 is actuated; and in the telescoping movement of cylinders 16, 17 their walls never actually contact with the walls of the stationary cylinder 23 as they are of different diameters and so spaced apart that the liquid seal in compartment 22 is always between them; thereby preventing wear and frictional contact of the cylinder walls.

At the upper end of cylinder 23 there is provided an air inlet valve 25 that is opened by suction; and interposed between it and cylinder 23 is a manually controlled valve 26 by means of which to open or close the air passage 27.

The purpose of valve 26 is to close passage 27 when it is desired to hold tank 9 in elevated position; that is, when tank 9 is actuated to its highest position, and valve 26 is closed, the vacuum tendency in cylinder 23 will prevent tank 9 from descending; consequently in stormy weather when unusual tides and waves are pounding on the cage 1, tank 9 can be held up in its highest position out of wrecking contact of the waves.

With valve 26 open, air is admitted through ball valve 25 to cylinder 23 when reciprocating tank 9 moves downward; and when this tank moves upward, the air taken into cylinder 23 is compressed and discharged through valve 28 and pipe 29 into storage tank 30.

The storage tank 30 is preferably a tunnel formed in the earth and of immense dimensions, capable of containing sufficient compressed air to operate the machinery of a manufacturing or electrical power plant 31, or other industry for a long period of time. The ends and wall of the tunnel 30 are formed of material that will be made air tight under the pressure produced. It is understood that by taking compressed air from one unit to supply air to be compressed by another unit and so on, with intermediate storage between the units, the air pressure may be stepped up to any practical extent, and that suitable air compressing pumps will be provided in the unit; and also that the units will be operated by the ocean after the same principle as herein set forth.

I provide a pump 32 for removing water from the interior of cylinder 17, and the construction and operation of this pump is substantially the same as shown in my said application Serial No. 421,569.

In practice tank 9 floats with a major portion of it extending upward above the surface of the water, and it is of sufficient length to easily compensate for the difference in surface levels of high and low tide without the telescoping cylinders 16, 17 and 23 separating; and the rise and fall of the tides and waves actuates tank 9 so that it intakes and discharges air to and from cylinder 23; and air thus actuated is driven into the storage tank 30.

The construction of tank 9 makes it especially buoyant so that it responds more readily to the uplift of the waves; which increases considerably its air compressing power; also its great size relative to the telescoping cylinders 16, 17 and stationary cylinder 23 proportionately increases the pressure applied toward forcing air from cylinder 23 into storage tank 30.

Each cylinder 23 leading from a unit may be provided with a safety valve 33 set to blow off at a predetermined pressure, and the outlet from each safety valve may lead to the air supply for a pump of a lower pressure unit.

In the modification shown in Fig. 7 I provide intermediate storage tanks 34 between the air compressing units $a$, $b$, $c$, $d$; and these units are connected to these tanks with proper pipes 35 and check valves 36; so that air taken into air compressing unit $a$ will be successively operated on by the units $b$, $c$, $d$ before it is driven into storage tunnel 30.

I claim.

1. In an apparatus of the class described comprising a pier, a cage secured to the pier, a stationary cylinder secured to said cage, and a reciprocating tank mounted in said cage and having a vacuum chamber therein, cylinders with open upper ends secured in said reciprocating tank; said cylinders being positioned to telescope with said stationary cylinder, and a storage tunnel for the purpose specified.

2. In an apparatus of the class described comprising a cage, a stationary cylinder secured in said cage, and a reciprocating tank mounted in said cage and having a vacuum chamber therein, cylinders with open upper ends secured in said reciprocating tank; said cylinders being positioned to form a space therebetween and to telescope with said stationary cylinder without contact of the cylinder walls, a liquid seal in the space between said cylinders, and means for guiding said reciprocating tank as it moves up and down in said cage.

3. An apparatus of the class described comprising a cage, a stationary cylinder secured in said cage, a reciprocating tank mounted in said cage and having an air tight chamber therein, cylinders with open upper ends secured in said reciprocating tank; said cylinders being positioned to telescope with said stationary cylinder without contact of the cylinder walls, a liquid seal between said stationary cylinder and said cylinders with open upper ends; air inlet and outlet valves connected with said stationary cylinder, and means for guiding said reciprocating tank as it moves up and down in said cage.

4. In an apparatus of the class described comprising a cage, a stationary cylinder secured to said cage and having an open lower end, a reciprocating tank mounted in said cage, and cylinders secured to said tank and having open upper ends, said cylinders being positioned to form a space therebetween and to telescope with said stationary cylinder without contact of the cylinder walls.

5. In an apparatus of the class described comprising a cage, a stationary cylinder secured to said cage and having an open lower end, a reciprocating tank mounted in said cage, cylinders secured to said tank and having open upper ends, said cylinders being positioned to form a space therebetween and to telescope with said stationary cylinder without contact of the cylinder walls, and a liquid seal in the space between said cylinders.

6. In an apparatus of the class described, a cage, a stationary cylinder secured to said cage and having an open end, a reciprocating tank mounted in said cage and having its ends closed by upper and lower end plates to form an air tight chamber, and open ended cylinders secured to said tank, one of which is secured to said upper end plate, and adapted to telescope with said stationary cylinder.

7. In an apparatus of the class described, a cage, a stationary cylinder secured to said cage and having an open end, a reciprocating tank mounted in said cage and having its ends closed by upper and lower end plates to form an air tight chamber, open ended cylinders secured to said tank, one of which is secured to said upper end plate, and adapted to telescope with said stationary cylinder, and a liquid seal between the reciprocating cylinder and both sides of the stationary cylinder.

8. In an apparatus of the class described comprising a cage, a stationary cylinder secured to said cage, a reciprocating tank, a plurality of cylinders secured in said tank, and spaced apart to form an annular compartment having an open top, a liquid in said compartment, said cylinders being positioned so as to telescope said stationary cylinder, a vacuum in said tank which surrounds said cylinders forming said compartment, air inlets and outlets in said stationary cylinder, and means whereby said tank can be held up and out of engagement with waves which reciprocate the tank.

9. In an apparatus of the class described, a cage, a stationary cylinder secured to said cage and having an open end, a reciprocating tank mounted in said cage and having its ends closed by upper and lower end plates to form an air tight chamber, and open ended cylinders secured to said tank, one of which is secured to said upper end plate, said cylinders being positioned to form a space therebetween and to telescope with said stationary cylinder without contact of the cylinder walls.

In testimony whereof, I have hereunto set my hand at Los Angeles, California, this 28th day of May, 1921.

CHAS. N. HARE.

Witness:
JAMES R. TOWNSEND.